United States Patent [19]

Chomka et al.

[11] Patent Number: 5,397,468
[45] Date of Patent: Mar. 14, 1995

[54] WATER PURIFIER CARTRIDGE COUPLING

[75] Inventors: Chester E. Chomka, Bellevue; James R. Edwards; Charles T. Nachtman, both of Dubuque, all of Iowa

[73] Assignee: Barnstead Thermolyne, Dubuque, Iowa

[21] Appl. No.: 185,377

[22] Filed: Jan. 24, 1994

Related U.S. Application Data

[62] Division of Ser. No. 950,931, Sep. 24, 1992.

[51] Int. Cl.⁶ .................... B01D 27/08; B01D 35/30
[52] U.S. Cl. .................... 210/232; 210/249; 210/282; 210/284; 210/290
[58] Field of Search ............ 210/232, 234, 235, 266, 210/282, 285, 286, 541, 542, 249, 236, 282, 290, 284

[56] References Cited

U.S. PATENT DOCUMENTS

| | | | |
|---|---|---|---|
| 2,229,850 | 1/1941 | Hoskins | 210/235 |
| 3,317,048 | 5/1967 | Kasten | 210/234 |
| 3,502,214 | 3/1970 | Mills et al. | 210/235 |
| 4,280,912 | 7/1981 | Berry, III et al. | 210/662 |
| 4,654,142 | 3/1987 | Thomsen et al. | 210/282 |
| 4,877,521 | 10/1989 | Petrucci et al. | 210/282 |
| 4,944,875 | 7/1990 | Gaignet | 210/232 |
| 5,122,265 | 6/1992 | Mora et al. | 210/259 |
| 5,135,645 | 8/1992 | Sklenak et al. | 210/234 |
| 5,143,601 | 9/1992 | Slovak et al. | 210/259 |
| 5,188,727 | 2/1993 | Kurth et al. | 210/282 |
| 5,242,581 | 9/1993 | Mohr | 210/234 |
| 5,256,285 | 10/1993 | Tomita et al. | 210/235 |
| 5,320,752 | 6/1994 | Clark et al. | 210/282 |

*Primary Examiner*—Cynthia L. Nessler
*Attorney, Agent, or Firm*—Wood, Herron & Evans

[57] ABSTRACT

A water purifier for supplying high purity water with a low total organic carbon content. The purifier includes removable cartridges that contain a series of organic and ion exchange purification media. Special couplings are used to permit the cartridges to be easily and quickly connected to and removed from the water purifier. In addition, the cartridges contain a check valve to minimize water drainage from the cartridge when the cartridge is removed. Selected water purifier components are constructed of fluorinated polyethylene.

12 Claims, 3 Drawing Sheets

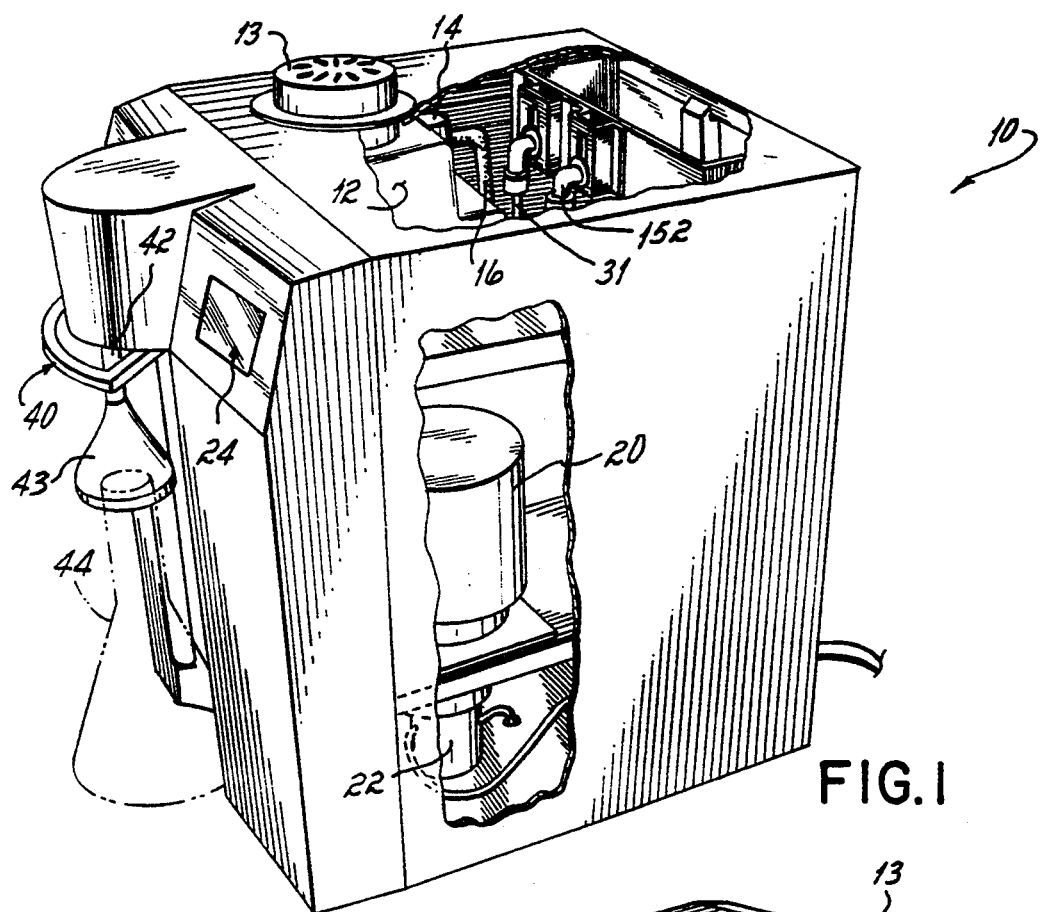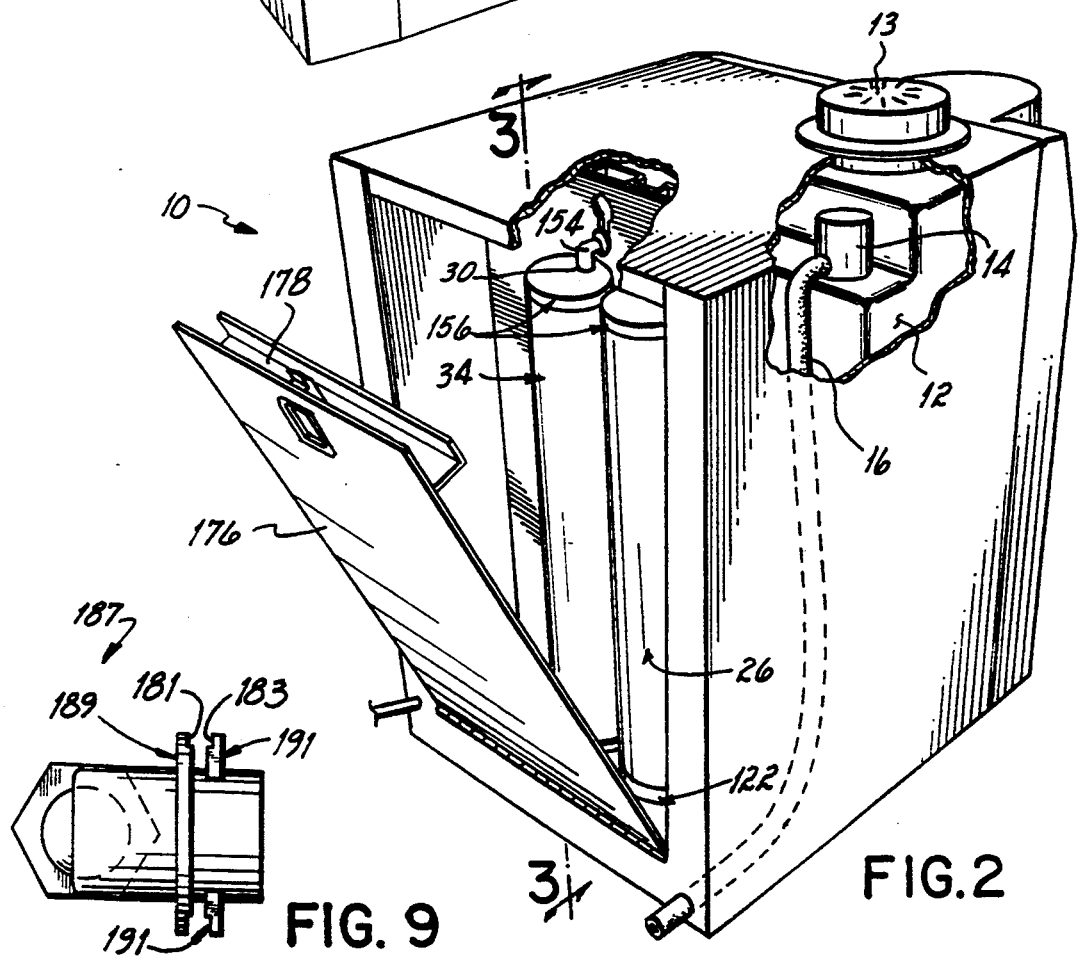

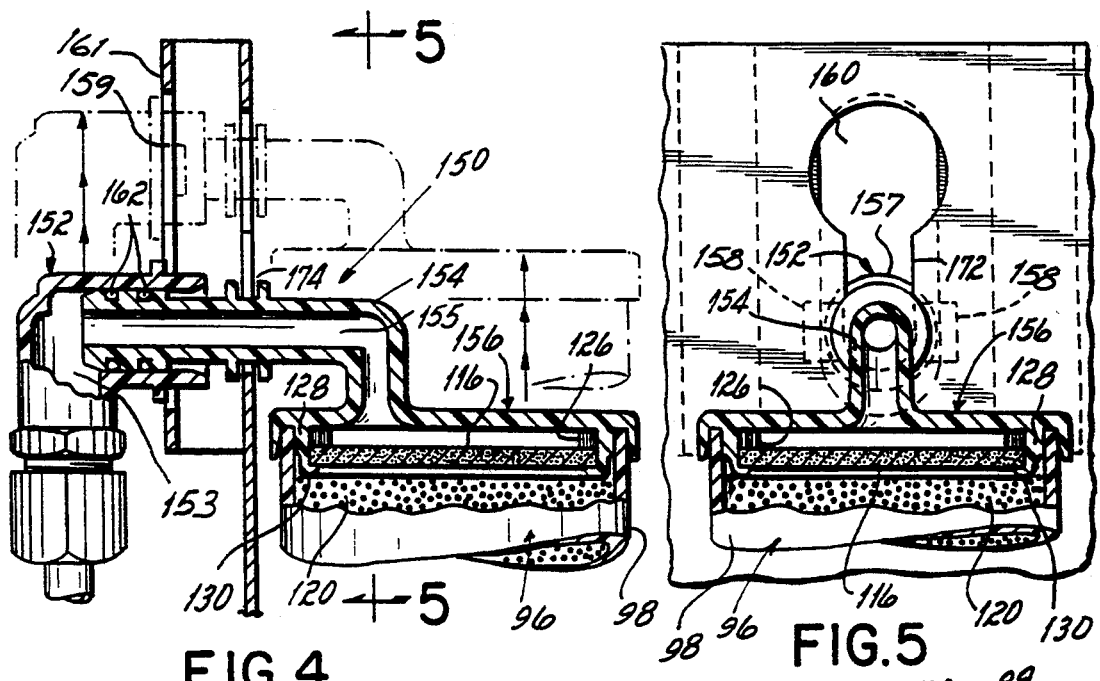
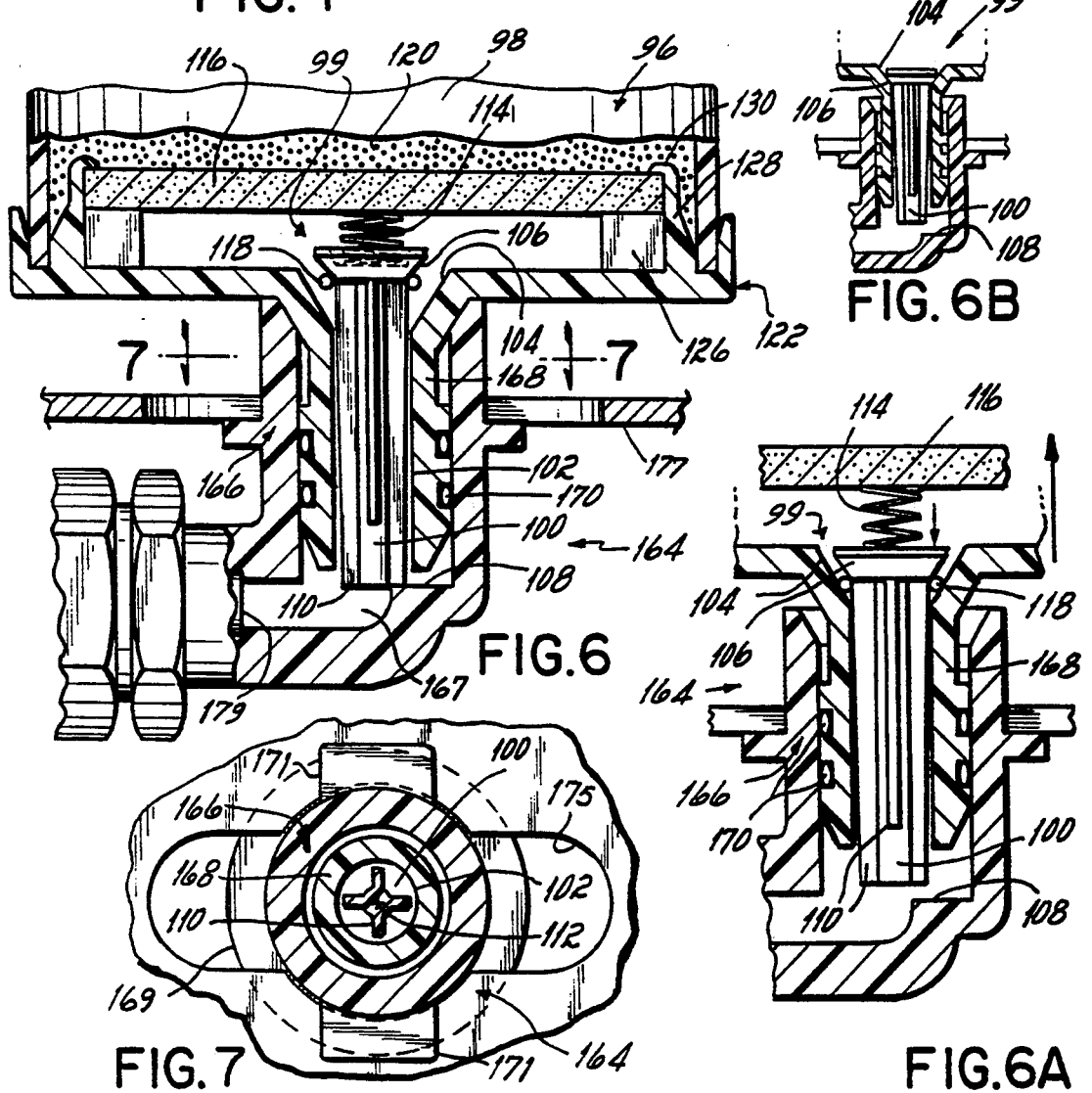

WATER PURIFIER CARTRIDGE COUPLING

This is a division of application Ser. No. 07/950,931, filed Sep. 24, 1992.

BACKGROUND OF THE INVENTION

1. Field of the Invention

This invention relates to a water purifier, and more particularly, to a water purifier for providing high quality reagent grade water with a resistivity of up to 18.3 megohm-cm and a total organic carbon content on the order of 10 parts per billion.

2. Description of the Related Art

With the increasing sophistication of scientific testing and analysis, the requirements for uncontaminated water for laboratory use has likewise increased. The purity of water is graded according to standards established by professional societies. For example, Type I water is the highest purity and is used for high performance liquid chromography, atomic absorption spectrometry, tissue culture, etc. Type II water is less pure and may be used for hematological, serological, and microbiological procedures. Type III water is suitable for general laboratory qualitative analyses such as urinalysis, parasitology and histological procedures.

The majority of impurities in potable water are in the form of disassociated ionized mineral salts which carry an electrical charge; and therefore, the presence of ionic contaminants is directly related to the electrical conductivity of the water. Conversely, the absence of the water's ability to conduct electricity is measured by its resistivity. Therefore, conductivity and its reciprocal, resistivity, are standard variables by which the purity of water is measured. Typically, resistivity is measured in ohm-cm units at a reference temperature of 25° C.; and at that temperature, absolutely pure water measures 18.3 megohm-cm.

More recently, high performance liquid chromatography ("HPLC") has been used to detect the presence of low levels of specific organic compounds. Consequently, water used in that analysis should contain no more than a few parts per billion ("ppb") of total organics.

In order to achieve the above standards of water purification, existing water purifiers are relatively large and typically have four or more large canisters containing purification cartridges. In those systems, water enters the canister at the top, typically flows down through the cartridge, exits the cartridge at the bottom of the canister, and flows up through the canister on the outside of the cartridge. Such a flow path exposes the water to a substantial surface area after passing through the purification media thereby adding contaminants to the purified water. To deal with that contamination, more purification media is required. While the reusable canisters have a sturdy construction, the canister cartridges have a less substantial construction which may permit purification media fines to escape the cartridge and lodge in downstream components.

In other water purification systems, several purification cartridges are packaged together into a single purification unit which via fluid couplings may be plugged into and unplugged from the purifier. A disadvantage of such a system is that cartridge elements within the purification unit may have different life cycles; and therefore, the unit life is determined by the cartridge element having the shortest life cycle.

SUMMARY OF THE INVENTION

To overcome the disadvantages of existing water purifier systems, a primary object of the present invention is to provide a water purifier producing high quality reagent grade water utilizing water purifying cartridges that may be readily connected to and disconnected from the water purifier.

According to the principles of the present invention a water purifier has two cartridges which contain numerous layers of purification media to provide pure water with a resistivity of 18.3 megohm-cm and a TOC count of less than 10 ppb. The cartridges are connected to the water purifier by means of couplings which permits an easy cartridge exchange. Further, each of the cartridges contains a check valve to minimize water drainage from the cartridge upon its removal. The purification media is restrained within the cartridge by an end cap design that provides a seal between a porous end piece and the cartridge end cap. Further, selected water purifier components are constructed of fluorinated polyethylene.

The invention has an advantage of permitting individual purification cartridges to be quickly and easily connected to and removed from the water purifier without the use of a canister holding system or the drainage of water from the cartridge. A further advantage is that pure water of the above specifications is provided by a water purifier that is substantially smaller than existing units.

These and other objects and advantages of the present invention will become more readily apparent during the following detailed description taken in conjunction with the drawings herein.

BRIEF DESCRIPTION OF THE DRAWINGS

FIG. 1 is a front and side perspective of the water purifier.

FIG. 2 is a rear and side perspective of the water purifier.

FIG. 4 is a cross-sectional view taken along lines 4—4 of FIG. 3 illustrating the upper cartridge coupling.

FIG. 5 is a cross-sectional view taken along lines 5—5 of FIG. 4.

FIG. 6 is a cross-sectional view taken along lines 6—6 of FIG. 3 illustrating the lower coupling with the check valve open.

FIG. 6A is a cross-sectional view taken along lines 6—6 of FIG. 3 illustrating the check valve in the closed position.

FIG. 6B is a cross-sectional view taken along lines 6—6 of FIG. 3 illustrating an alternative embodiment of the check valve.

FIG. 7 is a cross-sectional view taken along lines 7—7 of FIG. 6.

FIG. 9 illustrates an alternative embodiment of a fluid coupling member.

DETAILED DESCRIPTION

Figure 8:
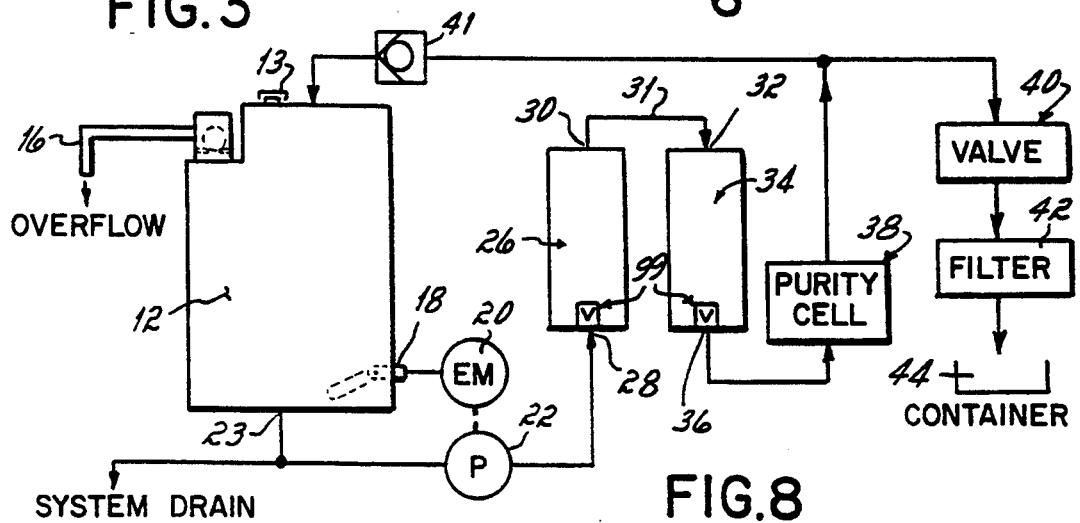
FIG. 8 is a schematic diagram of the water purifier.

The operation of a batch feed water purifier will be described with regard to FIGS. 1, 2 and 8. Feed water pretreated with a distillation process, reverse osmosis process or deionization process may be poured into a feed water tank 12 by removing a cap 13 of the batch feed water purifier 10. The feed water tank 12 has an overflow valve 14 connected to an overflow tube 16 for draining excessive water from the feed water tank. A low water level sensor and switch 18 are effective to shut off an electric motor 20 driving a pump 22. In an alternative embodiment, the water purifier system may be connected directly to a source of distilled, reverse osmosis or deionized water; and the feed water tank 12 would be replaced by a pressure reducer connected to the pump input.

The water purification is effected by a series of organic and ion exchange purification media contained within the water purifier cartridges 26 and 34. A control panel 24 operates with electrical switches and circuits to turn power on and off, to select a continuous run mode, and to select a standby mode. In the continuous run mode, the electric motor 20 drives the pump 22 which pumps water from an outlet 23 at the bottom of the feed water tank 12 into an inlet 28 at the bottom of a pretreatment cartridge 26. The water flows up through several layers of purification media and through an outlet 30 at the top end of the cartridge 26. The water then passes through an inlet 32 at the top of a high purity, low TOC cartridge 34. After passing through several additional purification media, pure water is discharged through an outlet 36 at the bottom of the cartridge 34 which has a resistivity of up to 18.3 megohm-cm and a TOC count in the order of 10 ppb.

The water then passes through an in-line well which contains a purity cell 38. The purity cell is operative with the control panel 24 to provide a reading of the resistivity of the water. The water then recirculates back into the feed water tank 12 through the check valve 41. A purity cell that may be used with the present invention is identical to the cell and cell well used in the purity meter Part No. PC550X1A available from the assignee of the present invention.

Pure water is an active solvent and will attempt to chemically react with all surfaces within the purifier thereby introducing contaminants from those surfaces. Therefore, in the continuous run mode, the water from the feed tank is continuously pumped through the cartridges and back into the feed tank. In the stand-by mode of operation, the motor and pump are operated to recirculate the water through the cartridges on an intermittent basis, for example, for ten minutes out of every hour.

Pure water may be obtained from the purifier 10 by manually activating the valve 40 and permitting water to flow through a final filter 42 into container 44 shown in phantom in a position removed-from the purifier. A dust cover 43 helps to keep airborne impurities from the junction where the container 44 connects to the purifier. The check valve 41 provides a small backpressure to force the water through the filter 42. The filter 42 has a 0.2 micron pore size which is effective for removing submicron bacteria and particulates from the water. Such a filter is commercially available as part No. FL703X2 from the assignee of the present application.

Figure 3:
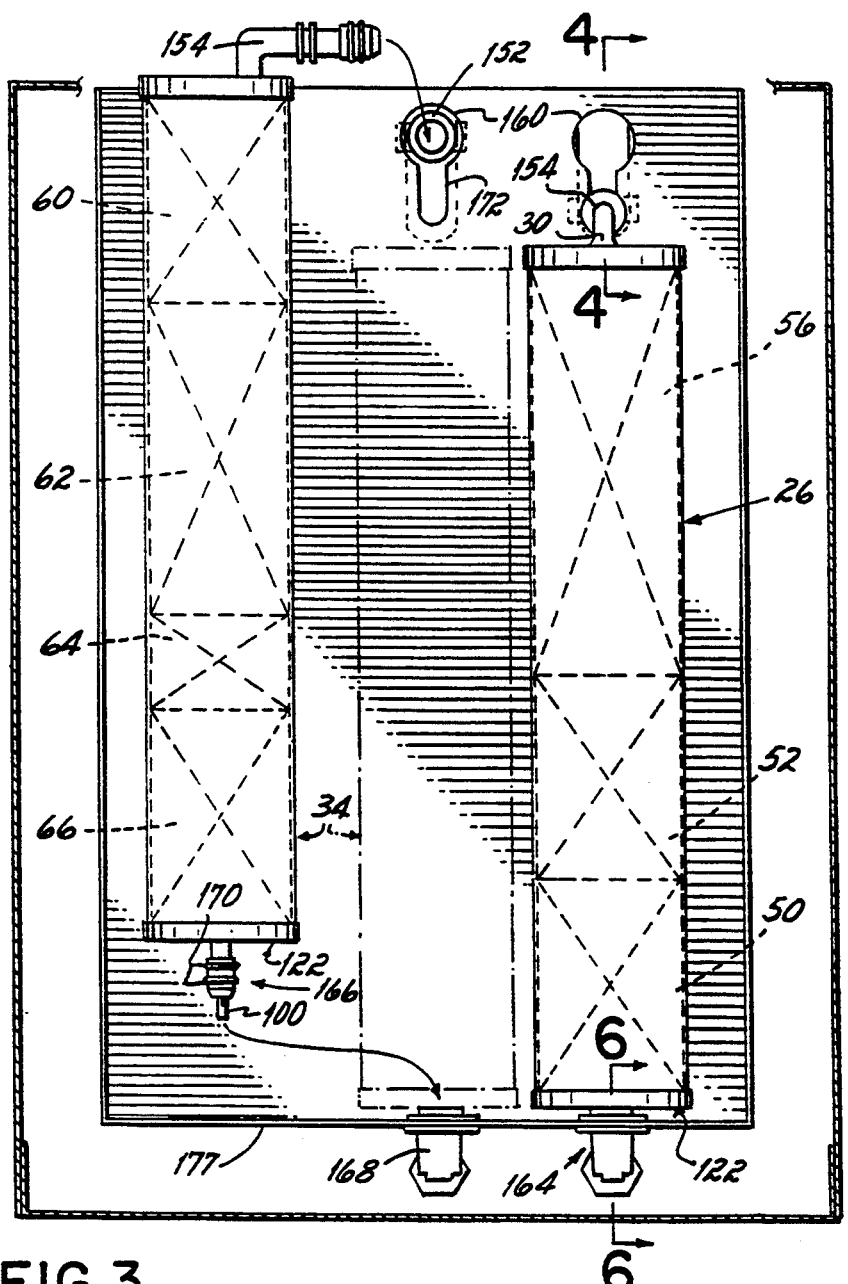
FIG. 3 is a cross-sectional view taken along lines 3—3 of FIG. 2 illustrating the purification cartridges and couplings.

Referring to FIG. 3, cartridge 26 is an upflow pretreatment cartridge which contains 3 layers of purification media. The cartridge is commercially available as part No. D50230 from the assignee of the present application. A first purification media 50 is approximately 0.0055 cubic feet of granular activated carbon, 20×50 mesh, and is commercially available as part No. CM502X6 from the assignee of the present invention. This first stage removes organic materials and chlorine, and the purification media 50 may be comprised of either one or a mixture of available acid washed carbons. Acid washed carbons are used because they contain fewer soluble organics that will leach into the water being purified; and therefore, the water passing from the carbon to the following mixed bed resin contains less ionic contamination from the carbon. Hence the life of the mixed bed resin is extended, and the whole system is more efficient. The media 50 may be a mixture of approximately 50% by volume of high efficiency, highly active metallurgical grade bituminous carbon and approximately 50% by volume of high efficiency, highly active coconut shell carbon. Such a mixture is effective to remove organic contaminants over a relatively wide range of molecular weights.

A second layer of purification media 52 is approximately 0.0055 cubic feet of strong base macroreticular anion, commercially available as part No. CM502X4 from the assignee of the present invention. This media is a chloride form resin that has a unique pore size design to remove colloidal particulates. Colloids are very slightly ionized extremely small particles that may clog conventional filtration and reduce the effectiveness of the deionization resin. Therefore colloids are removed at an early stage of the filtration process. The above purification process is used if the feed water has been pretreated with a deionization process. If the feed water has been treated by a distillation or a reverse osmosis process, the colloids have already been removed; and this second layer of purification media may be eliminated.

A third layer of purification media 56 is approximately 0.0109 cubic feet high purity mixed bed of semiconductor grade resin in which the mix is 40% strong acid cation and 60% strong base anion. The cation removal resin typically has hydrogen ions attached to its structure and is capable of exchanging for positively charged ions. The anion resin typically has hydroxyl groups attached to its structure and is capable of exchanging for negatively charged ions. The utilization of a mixed bed purification layer results in more efficient deionization allowing the water to polish up to 18.3 megohm-cm.

The water then passes through the outlet 30 of the first cartridge 26 and is piped by a flexible hose 31 to the inlet 32 of a downflow, high purity, low T0C four layer cartridge 34. A first layer of purification media 60 is identical to the layer of purification media 50 previously described and is a second stage of organic filtering for removing organic materials that were able to pass through the cartridge 26. A second layer of purification media 62 is a second stage of ion exchange for removing ionic contaminants and is identical to the layer of purification media 56 previously described. This second stage of deionization polishes the water resistivity up to 18.3 megohm-cm. A third layer of purification media 64 is comprised of approximately 0.0025 cubic feet of high efficiency synthetic bead activated carbon which is commercially available as part No. CM502X3 from the assignee of the present invention. This stage of purification is effective in removing trace levels of organic materials.

A fourth layer of purification media 66 in cartridge 34 is comprised of approximately 0.0057 cubic feet of a mixture of 10% high efficiency synthetic bead activated carbon identical to that used in purification layer 64 and 90% semiconductor grade mixed bed composed of 40% strong acid cation and 60% strong base anion. The purification media 66 is commercially available as part No. 31053 from the assignee of the present invention. This stage is a combination of organic removal and deionization and effects final removal of trace levels of organics as well as a final polishing of the water resistivity.

The easy and quick removal of the cartridges 26 and 34 from the water purifier 10 is facilitated by fluid couplings which represent a further feature of the invention. FIGS. 4 through 7 and FIG. 9 illustrate a cartridge construction which may be applied to either or both of the cartridges 26 and 34. FIGS. 4 and 5 illustrate an upper fluid coupling 150 which is located at the top of a cartridge. The upper fluid coupling 150 is comprised of a first member 152 connected to the water purifier and a second member 154 connected to the upper end cap assembly 156. The purifier further has a hole 160 for receiving the second member 154. Extending from the hole 160 is a slot 172 with a longitudinal axis parallel to the vertical direction. To connect the cartridge to the water purifier, the first member 152 is raised to a position illustrated in phantom in FIG. 4. The second member is moved in a first, horizontal, direction through the hole 160 and is then slidably moved into engagement with the first member 152. O-rings 162 provide a watertight seal between the coupling members 152 and 154. The first and second members 152 and 154 have internal passages 153 and 155, respectively, providing a fluid path through the upper fluid coupling between the top of the cartridge and the water purifier.

Located near one end of the first member 152 is an annular flange 157 and a pair of diametrically opposed tabs 158. The first member 152 is mounted in the water purifier by inserting the pair of tabs 158 through slot 159 in bracket 161. The first member 152 is then rotated 90° to the orientation shown in FIGS. 4 and 5, to hold the first member 152 and restrain it from motion in the horizontal direction. However, the slot 159 has a length approximately equal to the length of the slot 172 and the diameter of the hole 160. Therefore, the member 152 is free to move vertically upward in the slot 159 to permit engagement with or disengagement from the second member 154. When the coupling 150 is disconnected, the first member 152 is held in its upper most position shown in phantom in FIG. 4 by a biasing force provided by the hose 31 connected to the first member.

FIG. 6 illustrates a lower fluid coupling 164 which is located at the bottom of the cartridge. The lower fluid coupling 164 is comprised of a third member 166 connected to the water purifier, and a fourth member 168 connected to the bottom end cap assembly 122. After the first coupling has been engaged by sliding the member 154 in the horizontal direction into the member 152, the cartridge may be moved in a second, vertically downward direction to slidably move the third member 166 into the fourth member 168. 0-rings 170 provide a watertight seal between the fluid coupling members 166 and 168. The third and fourth members 166 and 168 have internal passages 167 and 102, respectively, providing a fluid path through the lower fluid coupling 164 between the bottom of the cartridge and the water purifier.

The second member 154 of the first coupling 150 has a groove 174 which engages the slot 172 as the cartridge is moved in the vertically downward direction to engage the second coupling. Consequently, the engagement of the second coupling at the bottom of the cartridge simultaneously results in the first coupling 150 being locked against motion in the horizontal direction.

Referring to FIG. 2, a hinged cover 176 contains a plate 178 that is located above the upper end cap assembly 156 upon the cover being closed. The plate 178 prohibits motion of the cartridges 26 and 34 in the vertical upward direction, thereby preventing the third and fourth members of the lower fluid coupling from separating. In the illustrated embodiment, the first and second directions are perpendicular to each other.

Near one end of the third member 166 is an annular flange 169 and a pair of diametrically opposed tabs 171. The third member is mounted in the water purifier by inserting the tabs 171 through slot 175 in base plate 177. The third member 166 is then rotated 90° to the orientation shown in FIG. 7, thereby to hold the third member and restrain it from motion in the vertical direction. The passage 167 in the third member 166 is formed to receive a check valve 179 to prevent water from flowing from the water purifier through the third member 166 upon the removal of cartridge 96. An example of such a check valve is Part No. 110PPV-½# commercially available from Smart Products.

As described, coupling members 152 and 166 are identical with the exception that coupling member 166 is adapted to receive a check valve. Coupling member 187 illustrated in FIG. 9 is an alternative embodiment of coupling member 152 and 166. In some applications, it may be desirable that the bracket 161 or base plate 177 have a larger thickness. Therefore, the coupling member 187 has an annular step 181 and a stepped area 183 on the pair of tabs 191. Further, the mating slot would be larger to accommodate the larger stepped diameter so that the mating slot is held between the annular step 181 and stepped area 183. Although the coupling members 152, 166 and 187 have been illustrated as 90° elbows, those coupling members may alternatively be straight couplings.

Each of the cartridges 26 and 34 contain a check valve which automatically closes when the cartridges are removed from the water purifier, thereby preventing water from draining from the cartridges. FIGS. 6, 6A and 7 illustrate the construction of a purification cartridge including a check valve which may be used in either or both of the cartridges 26 and 34. A purification cartridge 96 is comprised of a cartridge tube 98 including a lower end cap assembly 122 and an upper end cap assembly 156. The end cap assemblies 122 and 156 are joined to the cartridge tube 98 to contain the fluid and purification media within the cartridge. A check valve 99 is comprised of a stem 100 which is slidably located within a cylindrical channel 102 at one end of the lower end cap assembly 122. The upper end of the cylindrical channel tapers outwardly relative to a longitudinal axis of the channel to form a first annular bearing surface 104. The upper end of the stem 100 also tapers outwardly relative to its longitudinal axis to form a second annular bearing surface 106 which is located opposite to and mates with the first annular bearing surface 104. The water purifier contains a locating surface 108. When the cartridge is connected to the water purifier, the stem 100 contacts the locating surface 108, thereby causing relative motion between the stem 100 and the channel 102. That motion separates the second annular bearing surface 106 from the first annular bearing surface 104, thereby providing a fluid path through the channel 102, past the stem 100 and past the purification media 120. As shown in FIG. 7, the stem has four flutes 110 equally spaced about its longitudinal-axis 112. As illustrated in FIG. 6A, as the cartridge is removed from the water purifier, the stem 100 loses contact with the locating surface 108, thereby allowing the stem to move downwardly in the cylindrical channel 102. The second annular bearing surface 106 moves into contact with the first annular bearing surface 104, thereby blocking the fluid path.

The embodiment illustrated in FIGS. 6 and 7 includes a spring 114 located between a porous end piece 116 and the stem 100. The spring provides a biasing force to bring the first and second annular bearing surfaces into contact. In addition, an O-ring 118 located on the stem for providing a seal between the first and second annular bearing surfaces. While the spring 114 and O-ring 118 have the advantage of maintaining a watertight seal regardless of the orientation of the cartridge, the inclusion of those elements has the disadvantage of potentially adding contaminants to the purified water. Consequently, in a second embodiment of the invention shown in FIG. 6B, the spring 114 and O-ring 118 are not utilized; and gravitational forces acting on the stem are effective to bring the first and second annular bearing surfaces into contact.

FIG. 6 illustrates a further feature of the invention by which the purification media 120 is contained within the cartridge 96 by the end cap assemblies 122 and 156. Referring to the end cap assembly 122 illustrated in FIG. 6, the cylindrical channel 102 provides a fluid path for the water. In addition, the porous end piece 116 is supported on blocks 126. The porous end piece 116 permits water to pass therethrough but is effective to maintain the purification media 120 within the contained volume defined by the cartridge 98 and end cap assemblies 122 and 156. To secure the end piece 116 in place and to provide a seal that prevents passage of the purification media 120, it is desirable to seal the joint between the outer diameter of the porous end piece and its adjoining member. Attempting to seal the joint itself presents manufacturing problems and requires close dimensional tolerances of the porous end piece and its adjoining member. Present designs do not provide a complete seal of the outer joint; and therefore, purification media fines may pass through the joint and lodge in downstream components. The end cap assembly of the present invention eliminates those problems by providing an interior wall 128 surrounding the porous end piece. Utilizing an ultrasonic process, an annular edge 130 of the wall 128 is heated and swagged into contact with the porous end piece 116, thereby holding the porous end piece in position and providing a positive seal preventing the purification media from passing by the porous end piece. In the preferred embodiment, the heating and swagging process results in the edge 130 of the interior wall 128 fusing to the surface of the porous end piece 116.

While the water purifier has been described as using pretreated feed water, untreated feed water may also be used; however, the efficiency of operation and life of the purification media is substantially reduced. The water purifier components which come into contact with the water, for example, feed water tank, tubing and fittings, valve parts, pump parts, purity cell well, cartridge housing and parts and canisters holding cartridges, etc., may be constructed of any material which substantially limits solvent absorption by the water of contaminants from those components. For example, those components may be constructed from Teflon ®, polypropylene, PVDF, etc. Applicant's have found that those components may also be constructed of fluorinated polyethylene or another fluorinated thermoplastic. Such a material is produced by a process in which fluorine gas is concentrated in a chamber holding the water purifier component, and the temperature, pressure and exposure time are controlled to create a permanent fluorocarbon barrier on all internal and external surfaces on the component. This chemical transformation restructures the molecules of the surfaces exposed to the fluorine gas to form a fluorocarbon skin which is very low in TOC extractables.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents following within the spirit and scope of the appended claims.

What is claimed is:

1. A water purifier of the type circulating feed water through purification media comprising:
   a first support member including a first slot and a second slot, the first and second slots being substantially parallel and of generally equal lengths, the lengths of the first and second slots extending in a first direction;
   a second support member including a third slot having a length extending in a second direction substantially perpendicular to the first direction;
   a first coupling member slidably mounted in the first slot of the first support member;
   a straight, tubular cartridge containing successive layers of the purification media and having a length extending in the first direction, the cartridge further including
      a second coupling member connected to a first end of the cartridge and having a first fluid passage extending in the second direction, the second coupling member extending through the second slot in the second direction to sealingly engage the first coupling member and slidably engage the second slot whereby upon the first coupling member engaging the second coupling member, the first and second coupling members are movable in unison in the respective first and second slots in response to motion of the cartridge in the first direction, and
      a third coupling member connected to a second, opposite end of the cartridge and having a second fluid passage extending in the first direction;
   a fourth coupling member slidably mounted in the third slot of the second support member, the fourth coupling member sealingly engaging the third coupling member in response to motion of the cartridge in the first direction.

2. The water purifier to claim 1 wherein the second slot comprises a wider first end for receiving the second coupling member and a narrower second end, and the second coupling member further comprising a first groove slidably engaging the narrower second end of the second slot in response to the cartridge being moved in the first direction thereby preventing said first and second coupling members from separating.

3. The water purifier of claim 1 further comprising a block being movable to a position adjacent the first end of the straight, tubular cartridge after the fourth coupling member sealingly engages the third coupling member thereby preventing said third and fourth members from separating.

4. The water purifier of claim 1 wherein said first coupling member has a annular flange proximate one end of said first coupling member and a pair of diametrically opposed tabs located adjacent the annular flange thereby forming a second groove between the annular flange and the pair of diametrically opposed tabs, whereby the first coupling member is mounted in the first slot by inserting the pair of diametrically opposed tabs through the first slot and rotating the first coupling member.

5. The water purifier of claim 1 wherein said fourth coupling member has a annular flange proximate one end of said fourth coupling member and a pair of diametrically opposed tabs located adjacent the annular flange thereby forming a third groove between the annular flange and the pair of diametrically opposed tabs, whereby the fourth coupling member is mounted in the third slot by inserting the pair of diametrically opposed tabs through the third slot and rotating the fourth coupling member.

6. The water purifier of claim 1 wherein the third coupling member further comprises a check valve located in the the second fluid passage to prevent the flow of fluid from the cartridge through the third coupling member.

7. The water purifier of claim 1 further comprising a first seal located between the first and second coupling members and a second seal located between the third and fourth coupling members.

8. The water purifier of claim 1 wherein the second slot includes an enlarged opening at one end receiving the second coupling member.

9. A water purifier of the type circulating feed water through purification media comprising:
   a first support member;
   a first coupling member slidably mounted to the first support member, the first coupling member being slidably movable with respect to the first support member in a first direction, and the first coupling member extending away from the first support member in a second direction generally perpendicular to the first direction;
   a second support member;
   a second coupling member mounted to the second support member at a fixed position, the second coupling member extending away from the second support member in the first direction; and
   a straight, tubular cartridge containing successive layers of the purification media and having a length extending in the first direction, the cartridge further including
   a third coupling member connected to a first end of the cartridge and extending in the second direction, the third coupling member sealingly engaging the slidable first coupling member, and
   a fourth coupling member connected to an opposite second end of the cartridge and extending in the first direction, the fourth coupling member sealingly engaging with the second coupling member,
   the second and fourth coupling members being engaged by motion of the cartridge in the first direction after engagement of the first and third coupling members by motion of the cartridge in the second direction.

10. A cartridge for a water purifier system for providing pure water comprising:
    a straight, tubular cartridge member having a length extending in a first direction, the cartridge member further including
    a first coupling member connected to a first end of the cartridge member and having a first fluid passage extending in a second direction generally perpendicular to the first direction, the first coupling member sealingly engaging a second coupling member slidably mounted on the water purifier by moving the cartridge in the second direction,
    a third coupling member connected to a second, opposite end of the cartridge member and having a second fluid passage extending in the first direction, the third coupling member sealingly engaging a fourth coupling member mounted on the water purifier by moving the cartridge in the first direction, whereby the first and the second coupling members are movable in unison in the first direction in response to moving the cartridge in the first direction to engage the third and fourth coupling members;
    a first purification media of approximately 0.0055 cubic feet of 20×50 mesh of acid washed granular activated carbon, and
    a second successive purification media of approximately 0.0109 cubic feet of a high purity mixed bed semiconductor grade resin including approximately 40% strong acid cation resin and approximately 60% strong base anion resin.

11. The water purifier system of claim 10 wherein the first purification cartridge further comprising a third purification media of approximately 0.0055 cubic feet of a strong base chloride form macroreticular anion resin, the seventh purification media being located between the first and the second purification media.

12. A cartridge for a water purifier system for providing pure water comprising;
    a straight, tubular cartridge member having a length extending in a first direction, the cartridge member further including
    a first coupling member connected to a first end of the cartridge member and having a first fluid passage extending in a second direction generally perpendicular to the first direction, the first coupling member sealingly engaging a second coupling member slidably mounted on the water purifier by moving the cartridge in the second direction,
    a third coupling member connected to a second, opposite end of the cartridge member and having a second fluid passage extending in the first direction, the third coupling member sealingly engaging a fourth coupling member mounted on the water purifier by moving the cartridge in the first direction, whereby the first and the second coupling members are movable in unison in the first direction in response to moving the cartridge in the first direction to engage the third and fourth coupling members;
    a first successive purification media of approximately 0.0055 cubic feet of 20×50 mesh of an acid washed granular activated carbon,
    a second successive purification media of approximately 0.0109 cubic feet of a high purity mixed bed of semiconductor grade resin including approximately 40% strong acid cation resin and approximately 60% strong base anion resin, a third successive purification media of approximately 0.0025 cubic feet of synthetic bead activated carbon, and a fourth successive purification media of approximately 0.0057 cubic feet of a mixture including 10% synthetic bead activated carbon and 90% of a high purity mixed bed of semiconductor grade resin including approximately 40% strong acid cation resin and approximately 60% strong base anion resin.

* * * * *